April 20, 1965 R. R. LARSON 3,179,322
EGG CRACKING PACKAGE
Filed June 13, 1963
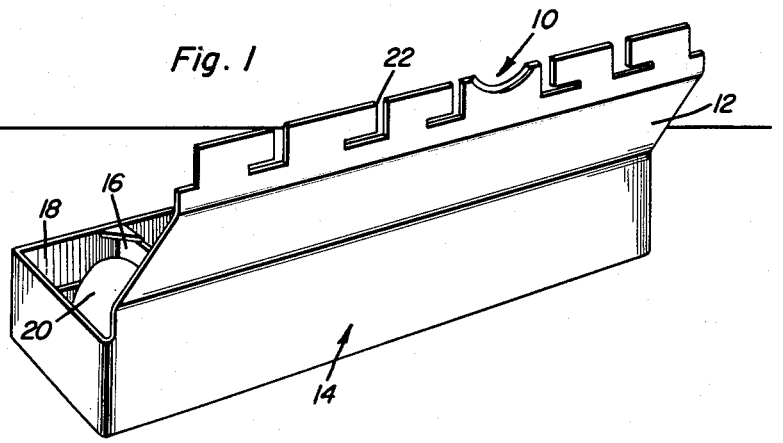
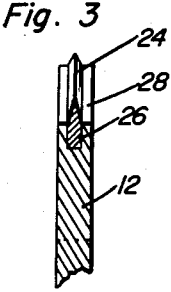
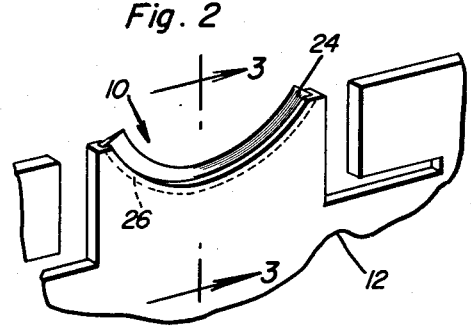
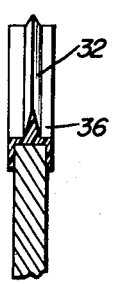
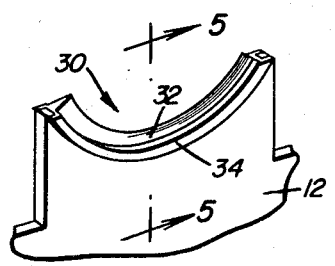
Roger R. Larson
INVENTOR.
BY *[signatures]*
Attorneys

United States Patent Office 3,179,322
Patented Apr. 20, 1965

3,179,322
EGG CRACKING PACKAGE
Roger R. Larson, 3244 N. University Ave., Decatur, Ill.
Filed June 13, 1963, Ser. No. 287,590
6 Claims. (Cl. 229—6)

This invention primarily relates to a new and novel means for cracking an egg which is affixed directly to the package in which the eggs are sold.

It is a primary object of this invention to disclose a novel egg package including means for breaking an egg embedded in or attached on the package and sold as an integral part thereof.

A further object of this invention resides in the fact that said means comprises a curved piece of metal or plastic which can be formed so as to approximate the curvature of the size of the egg vended within the package to which it is attached.

Yet another object of this invention is to provide an egg cracker of the character described, which further includes means to limit the depth of penetration through the egg shell whereby the yoke of the egg in the egg shell is left substantially undisturbed and in whole condition.

Still another object of this invention resides in the provision of an egg cracker which is so simple and inexpensive to produce that it will be economically feasible to incorporate such a means in a standard egg container.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of an egg carton or container with the egg cracking means attached thereto.

FIGURE 2 is a enlarged detailed view of the portion of the egg container or carton on which the egg cracking means is mounted.

FIGURE 3 is a fragmentary sectional view taken substantially along the plane indicated by line 3—3 of FIGURE 2.

FIGURE 4 is a view similar to FIGURE 2 but illustrates a slightly modified form of the invention.

FIGURE 5 is a fragmentary sectional view taken substantially along the plane indicated by the line 5—5 of FIGURE 4.

Referring now to the drawing in detail, the egg cracker generally designated by the numeral 10 is adapted to be mounted on or embedded within the lid 12 of any conventional egg container or carton such as 14. The egg carton or container 14 is of any conventional design and includes a plurality of partitions such as 16 for dividing the interior of the container into a plurality of compartments 18, each one of which houses an egg such as 20. In the embodiment of the egg carton or container disclosed a plurality of slots such as 22 are formed in one edge of the lid whereby the slots are adapted to pass over the partitions 16 when the lid is tucked into the container adjacent a side wall thereof. While a particular form of egg container or carton has been disclosed and shown in FIGURE 1, it is to be understood that this invention contemplates that the egg cracker 10 can be readily adapted and placed on any conventional egg carton or container.

Referring to the embodiment of the invention disclosed in FIGURES 2 and 3, it will be seen that the egg cracker 10 comprises an arcuate shaped piece of metal or inexpensive plastic 24 which is embedded within a slot 26 formed within a portion of the edge of the container lid 12. Of course, the metal or plastic piece 24 is adapted to be fixed fast to the sides of the slot 26 by any suitable means such as an adhesive or the like.

The piece 24 is formed of a length and curvature so as to approximate the widest width of the egg contained in the package 14. When the egg is removed from the package, it may be struck against the piece 24, which it will be noted is formed so as to terminate in a sharp tapered point. Due to the fact that the piece 24 is embedded within the slot 26, the piece 24 will penetrate to a depth only equal to the height of the piece 24 which extends above the surrounding walls 28 of the slot 26. That is, upon striking of the piece 24 with an egg, the depth of penetration of the piece into the egg will be limited by the egg making contact with the surrounding walls 28. This penetration is sufficient to crack the egg shell, but prevents the curved piece 24 from penetrating the egg yoke whereby the same will not be broken. It should be appreciated that due to the curved surface, penetration of the egg is substantially controlled, since if the surface was flat and straight the depth of penetration of the oval-shaped egg would vary.

Referring to the embodiment of the egg cracker as shown in FIGURES 4 and 5, it will be seen that the egg cracker is adapted to be disposed over the edge of the lid of the package rather than being embedded therein. In this embodiment, the egg cracker 30 comprises a curved plastic or metallic piece 32 which is also tapered to form an egg cracking surface. However, the piece 32, is seated upon an arcuate channel-shaped base 34. The base 34 is adapted to seat upon the edge of the lid 12 of the egg carton or package 14 and may be secured thereto by any suitable means such as an adhesive or the like. In this embodiment, the web portion 36 of the channel-shaped base 34 forms the limit means for the depth of penetration of the curved piece 32 into the egg shell.

It should now be apparent that a simple and efficient means has been provided for cracking eggs with a minimum of effort, time and mess. The egg package may be positioned near a skillet, an egg removed from the package and cracked and then the egg disposed within the skillet. This may be accomplished by holding the package steady with one hand and cracking the egg with the other hand. Due to the control provided for penetrating the egg on the egg cracker, there is very little chance of the egg yoke being broken or parts of the egg shell being disposed in the skillet with the egg. Further, the curved piece is made of inexpensive material whereby it may be disposed of when the package is empty and since the egg cracker is actually formed as part of the egg package or container, the cracker is always available for ready use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an egg carton of the type constructed of yieldable and somewhat flexible material and including at least one free edge portion including a semi-cylindrical free edge surface, an egg cracker constructed of relatively rigid material, means securing said cracker to said free edge portion with an arcuate surface thereof disposed in continuous surface-to-surface thrust distributing engagement with said free edge surface, said egg cracker including an arcuate marginal edge remote from and opening away from said free edge surface and adapted to cradle an egg struck thereagainst, said arcuate edge portion defining a transversely pointed edge.

2. The combination of claim 1 wherein said egg cracker is embedded in said free edge portion of said carton with portions of said egg carton projecting laterally outwardly from opposite sides of said arcuate marginal edge portion and adapted to limit penetration of said pointed edge through the shell of an egg.

3. The combination of claim 1 wherein said portions of said carton projecting laterally outwardly from opposite sides of said arcuate marginal edge portion are arcuate, concentric with said arcuate edge portion and having radii of curvature slightly greater than the radius of curvature of said semi-cylindrical edge surface.

4. The combination of claim 1 wherein said arcuate edge surface defines the web portion of an arcuate channel-shaped base in which said one free edge portion of said carton is seatingly secured.

5. The combination of claim 4 wherein the opposite side edge portions of said web portion project laterally outwardly from opposite sides of said arcuate marginal edge and have radii of curvature slightly greater than the radius of curvature of said semi-cylindrical edge surface, said web portion being concentric with said pointed edge and including radii of curvature slightly greater than the radius of curvature of said pointed edge so as to define means for limiting penetration of said pointed edge into an egg shell struck thereagainst.

6. In combination with an egg carton of the type constructed of yieldable and somewhat flexible material and including at least one free edge portion including a free edge surface, an egg cracker constructed of relatively rigid material and including means defining a generally channel-shaped base including a web portion, said egg cracker being secured to said one free edge portion with the latter seatingly received in said channel-shaped base and the free edge surface of said one free edge portion abuttingly engaging said web portion in surface-to-surface contacting engagement therewith, said egg cracker including means defining a marginal edge portion projecting outwardly from said base in a direction remote from the direction in which said base opens, said marginal edge portion also including a free edge surface against which an egg to be cracked may be struck, said base including portions projecting laterally outwardly of at least one side of said marginal edge portion spaced from said free edge surface thereof defining abutment means adapted to limit penetration of said marginal edge portion into an egg shell.

References Cited by the Examiner
UNITED STATES PATENTS

| | | | |
|---|---|---|---|
| 691,379 | 1/02 | Kendrick | 146—2.3 |
| 1,021,849 | 4/12 | Schweiger | 206—41.5 |
| 1,322,620 | 11/19 | Risdon | 146—2.3 |
| 2,655,259 | 10/53 | Davoren | 206—41.5 |
| 3,002,667 | 10/61 | Buttery | 206—58 |
| 3,107,039 | 10/63 | Painter | 229—28 |

FRANKLIN T. GARRETT, *Primary Examiner.*